Sept. 1, 1970     W. E. HUNNICUTT ET AL     3,526,120
EXTENSION CLAMP
Filed July 15, 1968
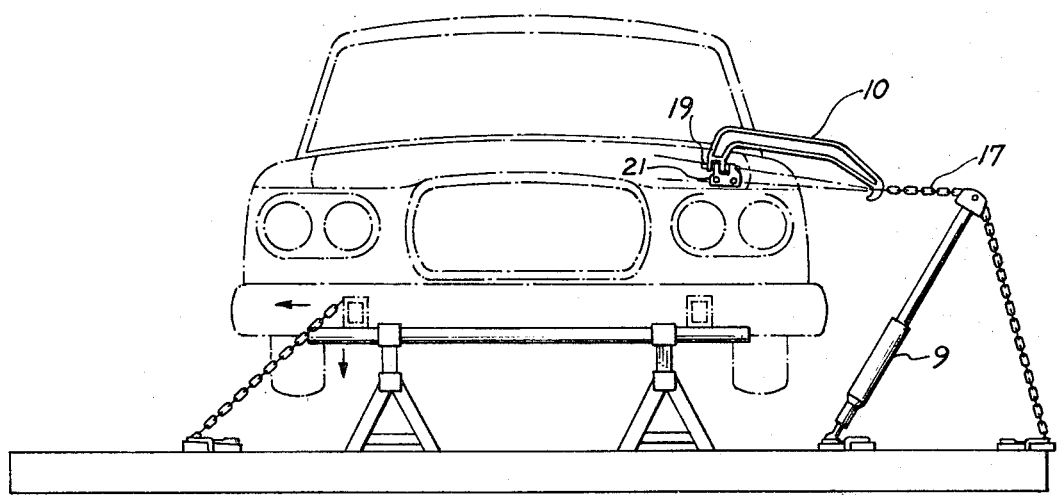
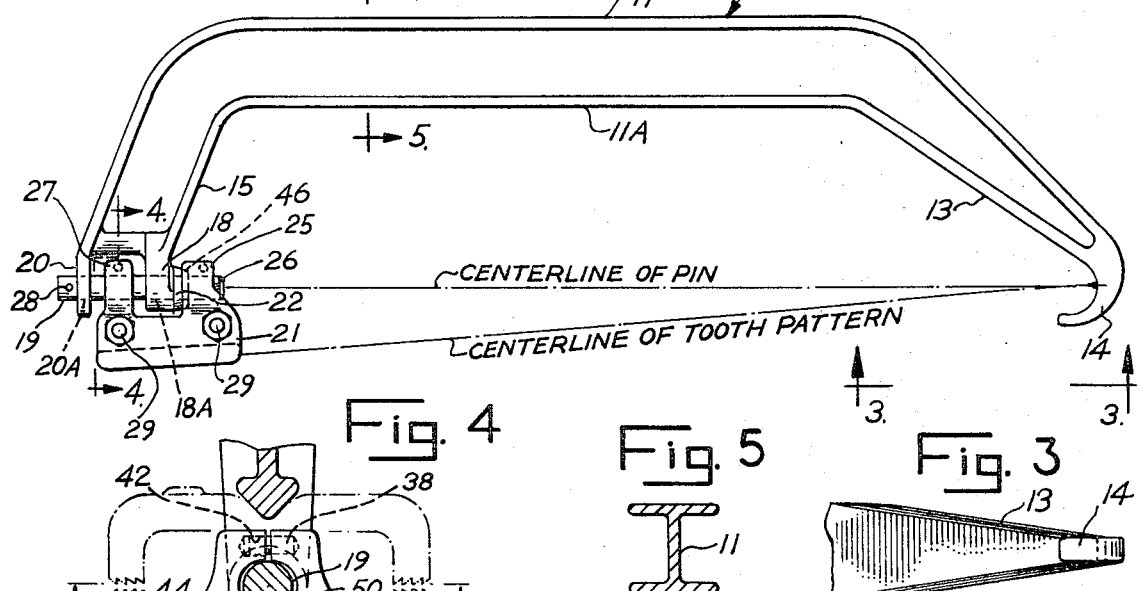
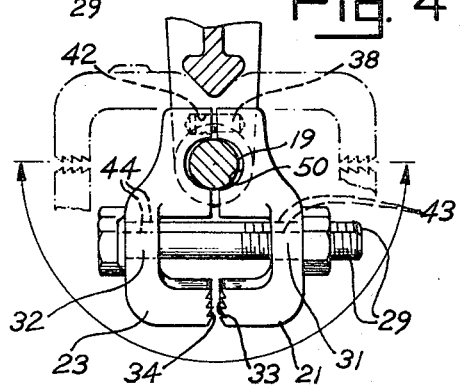
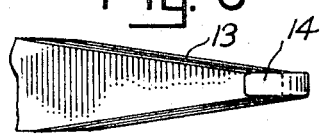
INVENTORS
WAYNE E. HUNNICUTT &
PETER G. ROSSBACH
BY
Petherbridge, O'Neill & Aubel
ATTORNEYS

United States Patent Office 3,526,120
Patented Sept. 1, 1970

3,526,120
EXTENSION CLAMP
Wayne E. Hunnicutt, Big Bend, and Peter G. Rossbach, Waukesha, Wis., assignors to Applied Power Industries, Inc., Milwaukee, Wis., a corporation of Wisconsin
Filed July 15, 1968, Ser. No. 744,748
Int. Cl. B21d 11/02
U.S. Cl. 72—302        12 Claims

ABSTRACT OF THE DISCLOSURE

An extension clamp is disclosed for attaching to, and pulling a sheet metal object where the line of pull is obstructed by structure.

---

Heretofore, it has been difficult to apply a tensile force on a sheet metal portion of a vehicle wherein the line of pull is obstructed by other portions of the vehicle structure. The invention particularly provides an apparatus which enables such pulls to be made effectively, conveniently and expeditiously.

More specifically, the inventive clamp includes an arm having angled projecting ends, one of which ends has a hook and the other end includes means for mounting jaws thereon for clamping onto sheet metal objects. The arm is swivelable or rotatable with respect to the jaws. The teeth of the jaws are arranged to maintain an alignment with the hook end of the clamp to prevent rotation of the clamp after it is clamped on the sheet metal object and thus provide a stable pull on the object.

The foregoing and other advantages and features of the invention will be apparent from the following more particular description of preferred embodiments of the invention, as illustrated in the accompanying drawings wherein:

FIG. 1 is a view showing the application of the inventive extension clamp wherein the clamp is connected to provide a pulling force on an automobile;

FIG. 2 is a side view of the clamp of FIG. 1;

FIG. 3 is a partial bottom view of the clamp of FIG. 2 taken along the line 3—3 of FIG. 2;

FIG. 4 is a side or edge view of the jaws of the clamp of FIG. 2 taken along the line 4—4 of FIG. 2; and FIG. 5 is a cross-sectional view of the clamp of FIG. 2 taken along the line 5—5 of FIG. 2.

Referring first to FIG. 2, the extension clamp 10 of the invention comprises an elongated arm 11, having a straight center portion 11A which is angled downwardly (as oriented in FIG. 2) at both end portions 13 and 15. As shown in FIG. 5, the arm 11 comprises essentially an I-beam in cross-section with the end portion 15 tapering toward a tip as shown in FIG. 3.

A hook 14 is formed at the extreme tip of end portion 13 (the right-hand end as oriented in FIG. 2) for purposes of enabling a force transmitting means such as a chain 17 (see also FIG. 1) to be connected thereto.

In the pulling setup of FIG. 1, the chain 17 is anchored at one end to suitable means and the other end of chain 17 is attached to hook 14. A hydraulic strut 9 is positioned intermediate the end portions of chain 17 and when strut 9 is extended a pulling force is provided to clamp 10. It is, of course, obvious that other apparatus for providing a pulling force to clamp 10 could likewise be employed.

The other or jaw carrying end 15 of arm 11 is bifurcated as at 18 and 20. A jaw pin 19 is mounted in apertures 18A and 20A, formed in bifurcated portions 18 and 20; to extend on either side of the bifurcated portions. The axis or center line of pin 19 lies in a line which when extended would intersect the hook 14 as shown in FIG. 2. Pin 19 includes a spring loaded detent or ball 26 on one end thereof which is utilized to hold pin 19 from freely slipping out of the apertures. The other end of pin 19 has a cross pin 28 to enable easy manual insertion and removal of pin 19 from its apertures.

Clamp 10 includes a pair of essentially similar mating jaws 21 and 23, see also FIG. 4. The jaws 21 and 23 each comprises, in side view, a C-shaped unit having spaced arms extending upwardly as oriented in FIG. 2. Arms 25 and 27 of jaw 21 and the corresponding arms (not numbered of jaw 23) are positioned to straddle bifurcated portion 18. Arms 25 and 27 of jaw 21 and the corresponding arms of jaw 23 are generally semicircular in end view (see FIG. 4) and are joined as by bolts, generally labeled 29, inserted in apertures 43 and 44 formed in jaws 21 and 23. Accordingly, arms 25 and 27 of jaw 21 and the corresponding arms of jaw 23 fit around and swivelably mount on pin 19, as indicated in FIG. 4.

Arms 25 and 27 of jaw 21 each include a dowel pin (only dowel pin 38 of arm 27 being labeled in FIG. 4). Dowel pin 38, and a corresponding dowel pin in arm 25 fit into respective mating recesses in jaw 23 (only recess 42 in arm 27 being shown in FIG. 4). The dowel pins fit into their respective recesses to properly position the jaws 21 and 23 with respect to each other.

The bifurcated portion 18 of arm 11 includes a truncated cone portion 22 with the smaller end of the cone extending toward the hook for purposes to be explained.

In end view and as best seen in FIG. 4, the lower or body portions 31 and 32 of jaws 21 and 23 are also formed in generally semicircular shape with the lowermost (as oriented in FIG. 4) part of the jaws 21 and 23 having teeth 33 and 34 formed thereon. When the jaws 21 and 23 are placed in juxtaposition and the bolts 29 tightened, the teeth 33 and 34 will grasp the sheet metal therebetween.

Again, note that jaws 21 and 23 are relatively freely swivelable or rotatable about pin 19 in an arc of approximately 180 degrees, as indicated by the phantom lines of FIG. 4. Thus, the jaws 21 and 23 can clamp onto a sheet metal plate equally well throughout a 180 degree arc of a circle. As will become clear, in general use, the jaws 21 and 23 are actually stationary and arm 11 rotates about the jaws.

The longitudinal axis of the teeth or tooth patterns 33 and 34 which extends from left to right as oriented in FIG. 2 is formed and arranged such that an imaginary extension of this longitudinal axis would intersect with the axis of pin 19 at the surface of hook 14, as shown in FIGS. 1 and 4. Thus, regardless of the angle at which the jaws are attached to a sheet metal object, the teeth 33 and 34 of the jaws 21 and 23 will be aligned with the hook 14. Accordingly, the jaws 21 and 23 can be clamped to a sheet metal object and the arm 11 can be placed in any position of the 180 degree arc mentioned above to reach around structural obstructions. Using arm 11 as reference the tooth surface 33 and 34 of clamped jaws 21 and 23 subscribe or move in the imaginary peripheral outline of a cone-shaped figure with the apex of the cone being the hook 14. Accordingly, this construction of the extension clamp 10 maintains the hook 14 in the line of the tooth pattern to prevent rotation of the clamp 10 and to thus provide a steady pull on the sheet metal object to which the clamp is attached. Also, the fact that the jaws 21 and 23 are rotatable with respect to the arm 11 tends to compensate for any twist in the chain, such as in FIG. 1, to thus assure a stable pull without unwanted torque is provided to the vehicle metal.

Refer now to the truncated cone portion 22 of bifurcation 18. The arms 25 of jaw 21 and the corresponding arm of jaw 23 when in juxtaposition form a cone-shaped recess 46 which receives the cone portion 22. The cone portion 22 and the recess 46 are dimensioned such that when the jaws 21 and 23 are clamped onto the sheet metal object, and a pulling force is applied to hook 14 of clamp 10, the cone portion 22 of arm 11 will wedge the arm 25 of jaw 21 and the corresponding arm of jaw 23 outwardly. The bolts 29 function as a fulcrum line about which the wedging force of cone portion 22 acts. Accordingly, the teeth 33 and 34 of the clamped jaws 21 and 23, which are effectively on the opposite side of fulcrum tend to grasp or clamp the sheet metal object even more firmly.

In practice, the jaws 21 and 23 are clamped on the sheet metal object to be grasped and pulled. Next, the arm 11 is positioned to avoid the obstruction (as for example, the fender of the automobile in FIG. 1) then the pin 19 is inserted through the apertures 18A and 20A of the bifurcated portions 18 and 20, and through the recess 50 formed by the juxtapositioned jaws 21 and 23 (see FIG. 4) to swivelably mount the arm 11 on the jaws. The chain 17 is then attached to hook 14 and a pulling force applied thereto. As described above, the inventive clamp will provide the capability of applying a stable pulling force with no undesired rotating moment applied by the clamp to the object being pulled.

Accordingly, the inventive clamp provides a means for effecting a firm steady pull on a sheet metal object wherein the line of pull may be obstructed by parts of the vehicle which would be difficult or undesirable to remove, such as, for example, undamaged fenders, quarter panels, radiator supports, bumpers, cowl posts. Thus, excessive time losses in removing such undamaged parts is avoided, resulting in more efficient and less time consuming repair operations.

While the invention has been particularly shown and described with reference to a preferred embodiment thereof, it will be understood by those skilled in the art that various changes in form and details may be made therein without departing from the spirit and scope of the invention.

We claim:

1. An extension clamp for clamping onto and providing a pull on an object wherein obstructions lie between the object and the line of pull, said clamp comprising an elongated member having angled ends, one of said ends having a hook for connecting to pulling means, the other end of said member having an elongated pin mounted thereon to have its center line aligned with said hook, jaws mounted on said pin for swivelable movement thereon, said jaws including an elongated toothed surface, the center line of the toothed surface being aligned with said hook, whereby a pulling force effective on said hook can readily be aligned with the force applied by the toothed surface to said object to thereby exert a steady pull on said object.

2. A clamp as in claim 1 including a pair of similar mating jaws, a truncated cone portion on said other end of said member, said jaws when in juxtaposition forming a recess for receiving said cone portion, bolt means for affixing said jaws in juxtaposition, said bolt means being positioned intermediate said recess in said jaws and said toothed surface whereby when a force is applied to said one end of said member, a wedging action is provided by said cone portion with said bolt means as a fulcrum to said jaws whereby said jaws grasp the sheet metal object more firmly.

3. A clamp as in claim 1 wherein said other end of said member comprises bifurcated portions, having apertures therein for mounting said pin, and wherein said jaws have spaced arms which interleave with said bifurcated portions, said jaws each having a generally semi-circular recess, means for affixing said jaws in juxtaposition whereby said recesses are effectively combined to provide a hole for receiving said pin to mount the jaws thereon.

4. A clamp as in claim 1 wherein said pin includes a detent on one end for maintaining said pin in position in said jaws and said apertures, and a cross-pin on the other end for enabling convenient insertion and removal of the pin.

5. A clamp as in claim 1 wherein the major portion of said arm is essentially an I-beam in cross section and the end of the arm having said hook is tapered to a tip.

6. A clamp as in claim 2 wherein projecting means on one of said jaws is locatable in receiving means in said other jaw to position said jaws relative to one another.

7. A clamp as in claim 1 wherein said member comprises a straight arm having angled ends which depend on generally a same direction, and wherein the extension of the center line of the said pin and an extension of the center line of the toothed surface pattern intersect at said hook.

8. A clamp as in claim 1 wherein said member and said jaws are swivelable relative to one another in an arc of a semi-circle.

9. A clamp as in claim 1 wherein said hook is connectable to a chain, and said member and jaws are swivelable relative to one another to compensate for any twisting of said chain to provide a steady pull on said object without any torque or rotating force.

10. A clamp as in claim 1 wherein the clamp and jaws are freely swivelable relative to each other to provide a steady pull on said jaws without any torque or rotating force.

11. An extension clamp for clamping onto and pulling on an object in situation where there are obstructions between the object and the line of pull, said clamp comprising an arm having two spaced ends, means for connecting one end of said member to force applying means, clamping jaws, the other end of said arm having a means for swivelably mounting said clamping jaws thereon, said mounting means having its center line aligned with said connecting means, said jaws including a toothed surface pattern for cooperatively clamping onto an object, the center line of said toothed surface pattern being aligned with said connecting means whereby a pulling force effective on said connecting means can readily be aligned with the force applied by the toothed surface to said object to thereby exert a steady pull on said object.

12. An extension clamp comprising an elongated body member having angularly depending ends, one of said ends comprising a hook attachable to a suitable pulling force member, the other end thereof including a mounting pin, jaws mounted on said pin for rotatable movement thereon, said jaws including an elongated surface for cooperatively grasping an object, means for tightening said jaws on said objects, the grasping surface on said jaws being aligned in an imaginary line extending from said surface to said hook, whereby a pulling force applied to the hook can readily be aligned with the pull applied by the surface of said clamp to said object.

References Cited

UNITED STATES PATENTS

| 2,845,983 | 8/1958 | Hanson | 72—302 |
| 3,111,159 | 11/1963 | Jenkins | 72—302 |

CHARLES W. LANHAM, Primary Examiner

B. J. MUSTAIKIS, Assistant Examiner

U.S. Cl. X.R.

72—705